United States Patent
Pick

[15] 3,701,093
[45] Oct. 24, 1972

[54] TILT INDICATION APPARATUS
[72] Inventor: Steve J. Pick, 18192 San Carlos, Fountain Valley, Calif. 92708
[22] Filed: July 29, 1971
[21] Appl. No.: 167,318

[52] U.S. Cl. .............................. 340/52 H, 200/61.52
[51] Int. Cl. ............................................. H01h 35/02
[58] Field of Search ....340/52 R, 52 H, 65; 200/61.2, 200/61.45, 61.52

[56] References Cited
UNITED STATES PATENTS 2,286,014  6/1942  Rowe .................... 340/27 AT
2,745,091  5/1956  Leffler ................... 340/27 AT
3,288,240  11/1966  Franzel .............. 200/61.52 X Primary Examiner—Alvin H. Waring
Attorney—Allan Rothenberg

[57] ABSTRACT

Direction and one of several discrete magnitudes of tilt are indicated by a mercury switching arrangement having secondary and tertiary contacts differently spaced from a central primary contact. The secondary contacts are employed to energize low tilt indicators and to give direction of tilt. The tertiary contacts indicate high tilt.

8 Claims, 3 Drawing Figures

PATENTED OCT 24 1972

3,701,093

INVENTOR.
STEVE J. PICK
BY Gausowitz, Carr
& Rothenberg
ATTORNEYS.

TILT INDICATION APPARATUS

BACKGROUND OF THE INVENTION

1. Field of the Invention

The present invention relates to electrical tilt measurement, and more particularly concerns apparatus that not only indicates direction of tilt but also provides a quantized measurement of tilt.

2. Description of Prior Art

A common level switch employs a conductive liquid such as mercury in a receptacle containing a number of contacts. These contacts include a central contact and one or a group of peripheral contacts that are equally spaced about the central contact. A quantity of mercury rests over the central contact and is spaced from each of the other contacts when the device is in a level condition. When the apparatus departs from horizontal, the pool of mercury shifts relative to the several contacts so as to touch both the central contact and at least one of the peripheral contacts to thereby complete an electrical circuit providing a desired indication or actuation. Typical of such liquid level switches are devices shown in U. S. Pats. Nos. 1,007,998 to Whalton and 977,523 to Gustafson. These arrangements provide for automatic leveling of an aircraft. A four position gravity vertical sensing switch is shown in U. S. Pat. No. 2,863,014 to Deer et al. Other liquid level switches and level indicators are shown in U. S. Pats. Nos. 3,013,623, 2,745,091, 2,376,377, and 1,729,735.

Although the prior-art arrangements all provide an output indication upon occurrence of tilt in a predetermined direction, there is no quantized information available. At best, these devices provide for a given direction of tilt and either an output or no output. If there is no output, then the apparatus is considered to be in an acceptably level position. When an output occurs, the device is assumed to be tilted. However, the amount of tilt can in no way be determined.

For many types of mobile equipment such as camping and trailer vehicles, there is a need to level the vehicle upon establishment of a camping site. Although there is often no specific limit of tilt beyond which the vehicle may be established in its camping site, an out of level condition of about two to three degrees of tilt is quite often accepted for many purposes and situations. However, for satisfactory operation of certain equipment carried aboard a vehicle, such as a refrigerator for example, a tilt of a predetermined magnitude, two degrees for example, may preclude satisfactory operation. Accordingly, it is desirable to be able to determine when the vehicle is tilted by this amount, and in which direction such tilt occurs.

For optimum leveling, one should be able to determine when the vehicle is tilted for example at a magnitude of about one degree and in which direction. Given this information as to direction and magnitude of tilt, correction may be made by either jacking a portion of the vehicle, or changing the vehicle location. Thus, indication of different amounts of tilt and the direction of each should be available. Nevertheless, none of the prior art mercury switches are capable of providing quantized tilt indication.

Accordingly, it is the object of the present invention to provide a measuring device that will not only indicate direction of tilt, but will also provide unique indications of distinct magnitudes of tilt.

SUMMARY OF THE INVENTION

In a liquid level sensor having a central primary contact and a plurality of secondary contacts spaced around the primary contact and adapted to be electrically connected by a pool of mercury when the device is tilted by a first magnitude, a second and greater magnitude of tilt is provided by a set of tertiary contacts spaced about the primary contact at a distance greater than the distance between the secondary contact and the primary contact. The tertiary contacts are connected in electrical circuits independent of the circuits of the primary and secondary contacts so that a unique indication may be provided when the electrically conductive liquid bridges the primary contact and one or more of the tertiary contacts.

DETAILED DESCRIPTION

Figure 1:
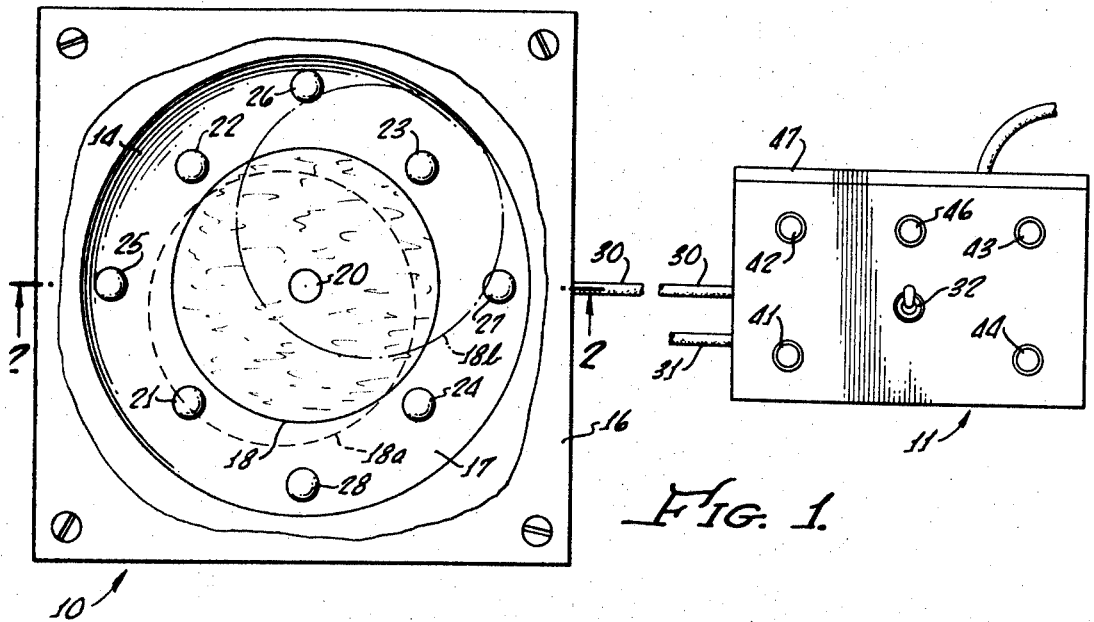
FIG. 1 illustrates a quantized magnitude and direction sensor and indicator constructed in accordance with principles of the present invention.
Figure 2:
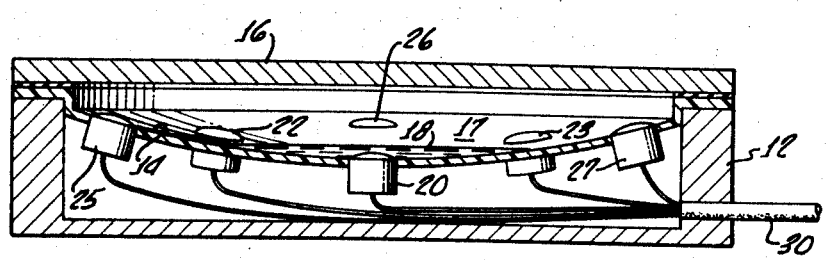
FIG. 2 is a cross-section of the sensor of FIG. 1.

As shown in FIGS. 1 and 2, measuring apparatus of a preferred embodiment of the present invention comprises a sensor 10 and an indicator panel 11. Sensor 10 is mounted and secured at any convenient location within the body of a vehicle (not shown). Indicator panel 11 is preferably mounted on the dashboard of the driving compartment so that the vehicle may be properly positioned at a site chosen according to information provided by the indicator panel.

Sensor 10 comprises a receptacle 12 having a lower concave surface 14 of generally spherical configuration and a sealing cover 16. Surface 14 forms the lower side of a sealed chamber 17 which contains a pool of electrically conductive liquid such as mercury 18.

Mounted to the receptacle 12 and protruding into chamber 17 through the surface 14 are a primary electrical contact 20 and a set of secondary electrical contacts 21, 22, 23, and 24. Also mounted to the receptacle and projecting into chamber 17 through the surface 14 is a set of tertiary electrical contacts 25, 26, 27, and 28. The several contacts are connected to external apparatus by means of electrical leads, collectively indicated at 30 in FIGS. 1 and 2.

The contacts of the secondary group are positioned at the corners of a rectangle, actually a square in the illustrated arrangement, that is centered upon the primary contact 20. The receptacle 12 is oriented in its attachment to the camper so that the rectangle of contacts 21 through 24 is oriented the same as the rectangle defined by the wheels of the vehicle. Thus, for example, contact 22 will be positioned in a location corresponding to the left front wheel of the vehicle; contact 23 in a position corresponding to the right front wheel, and contacts 21 and 24 in positions corresponding to the left and right rear wheels of the vehicle, respectively.

Contacts 25 through 28 of the set of tertiary contacts are also positioned at the corners of a rectangle, also a square in the illustrated arrangement, that is centered on the primary contact 20. However, the rectangle defined by the tertiary contacts is oriented at an angle of about 45 degrees with respect to the rectangle defined by the secondary contacts. Further, the rectangle of the tertiary contacts is slightly larger than the rectangle of the secondary contact. Accordingly, each of the secondary contacts 21 through 24 is spaced at the same distance from the primary contact 20 and each of the tertiary contacts 25 through 28 is spaced at the same distance from the primary contact 20, but the spacing of any one of the tertiary contacts from the primary contact is slightly greater than the spacing of any one of the secondary contacts from the primary contact.

Indicator panel 11 mounts an on/off switch 32 and four primary indicators in the form of lights 41, 42, 43, and 44. The panel and the primary indicators 41 through 44 are positioned so that respective ones of the indicators may be readily correlated with respective wheels of the vehicle. Thus, indicators 42 and 43 are correlated to the left and right front wheels and indicators 41 and 44 are correlated to the left and right rear wheels.

A secondary indicator, such as a light 46, is also mounted to the panel 11, and electrical connections are made to the panel from sensor 10 and from a power supply (not shown in FIGS. 1 and 2) by means of the electrical cable 30 and a second electrical cable 31. Indicator panel 11 may be mounted to the dashboard of the vehicle by a conventional bracket generally indicated at 47.

Figure 3:
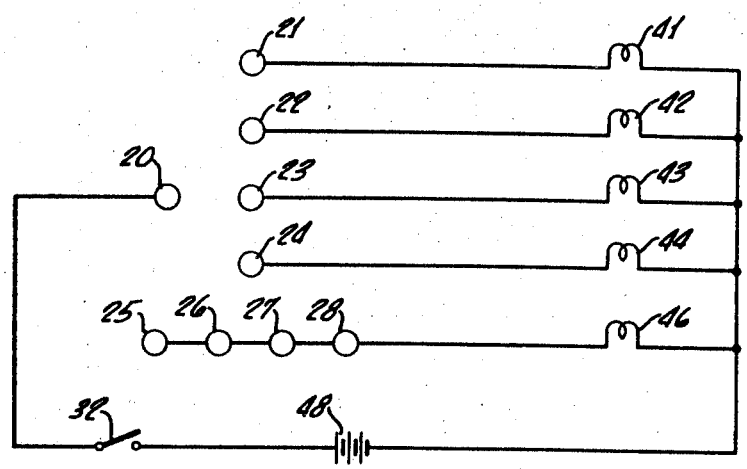
FIG. 3 illustrates electrical connections of parts of the apparatus of FIGS. 1 and 2.

As shown in FIG. 3, the various contacts and indicators are electrically connected in several different, independent and mutually discrete circuits.

Each of the secondary contacts 21 through 24 is connected in a unique and independent series circuit with an individual one of the indicator lights 41, 42, 43, 44, respectively, thence to one side of a power supply or battery 48, from the other side of the battery through the panel mounted switch, 32, and thence to the primary contact 20.

The tertiary contacts are connected in circuits independent of the secondary contacts. All of the tertiary contacts 25, 26, 27, and 28 are connected in series to each other and thence through indicator light 46 to battery 48 and thence through the switch 32 to the primary contact 20. Thus, each of the secondary contacts is connected in a different one of four independent circuits, including the four indicator lights 41, 42, 43, 44, respectively, and all of the tertiary contacts are connected in a fifth independent circuit, including the fifth indicator light 46.

In normal operation on level ground where the vehicle body is in a level condition, the mercury pool 18 is centrally located upon the concave surface 14, completely covering the central contact 20, but not touching any one of the secondary or tertiary contacts. Should the vehicle be tilted by a first magnitude of between one and two degrees, for example, with the left rear wheel being the lowermost portion of the vehicle, the mercury pool will shift to a position illustrated in dotted lines 18a in FIG. 1. In this position, the mercury pool will touch both the primary contact 20 and one of the secondary contacts 21, thus completing an electrical circuit between these contacts to thereby energize panel indicator light 41. In this position the mercury pool still does not touch any one of the tertiary contacts 25 through 28. Therefore, indicator light 46 is not energized.

Consider now a greater degree of tilt, a tilt in the amount of two to three degrees, for example. Such tilt is illustrated in FIG. 1 with the front right wheel of the vehicle being the lowermost part of the vehicle. This particular direction of tilt is chosen for clarity of the drawing, since the invention will operate to indicate directions and magnitudes of tilt in any direction. With this greater magnitude of tilt, the mercury pool shifts further to a position indicated by the dotted lines 18b. The mercury still touches the primary contact 20 and one of the equally spaced secondary contacts 23 (which is analogous to secondary contact 21 for tilt in the opposite direction). However, the pool has now shifted still further from the center of the surface 14 and will touch one or both of the tertiary contacts 26 and 27 in addition to the contacts 20 and 23. Thus the second electrical circuit is completed between the primary contact and one or both of the tertiary contacts 26 and 27 to thereby activate the indicator light 46.

Thus, if the vehicle is tilted less than the selected lower limit (one degree for example), all lights are out. If a first, relatively low magnitude of tilt is experienced, (one to two degrees, for example), one of the primary indicators 41 through 44 is energized to signal the particular direction of tilt and, in the absence of activation of the secondary indicator 46, to also signal a tilt magnitude that is greater than the lower limit of sensitivity of the apparatus, but less than an upper magnitude at which the secondary indicator is activated. When the vehicle experiences a tilt greater than the upper magnitude (greater than two degrees for example), the primary indicator remains activated and the secondary indicator is concomitantly activated to thereby provide an indication of increased tilt magnitude and of direction of such tilt.

It will be readily appreciated that the tertiary contacts 25, 26, 27, and 28, may all be connected in parallel to the single secondary indicator light 46, instead of the series connection shown in the drawings. Further, if deemed necessary or desirable, four separate secondary indicator lights corresponding to indicator light 46 may be provided and each one of these may be individually connected in series with an individual one of the tertiary contacts 25, 26, 27, and 28, so that a different one or a different pair of secondary indicator lights may be activated when a large magnitude of tilt is experienced in different directions.

The number of secondary and tertiary contacts illustrated is chosen largely for purposes of exposition, since it will be readily appreciated that the numbers of these contacts and indicators actuated thereby may be more than four, or less than four, without departing from the principles of the present invention.

In use of the described apparatus to choose an appropriate site for the camping vehicle, the operator will turn switch 32 to the on position and drive the vehicle to different locations until all five indicator lights 41, 42, 43, 44, and 46 are out. Preferably lights 41, 42, 43, and 44 will be of one color, green for example, and light 46 will be of another color, such as red. As the vehicle is driven about the parking area, the secondary light 46 may go out first, leaving one or two of the primary lights 41 through 44 on. Thus, the operator knows that the vehicle is level within two degrees and equipment such as a refrigerator may be operated with vehicle in such position.

Should this degree of tilt be unsatisfactory, the camper vehicle may either be moved again, or otherwise leveled to cause all of the panel lights to be extinguished.

As previously indicated, each of the primary indicator lights 41 through 44 represents a respective wheel of the vehicle. Thus, if light 42 remains on, it is known that the left front of the vehicle is low. Should both lights 43 and 44 remain on, then it is known that the right side of the vehicle is low. Similar information is provided by the remaining energization of other ones, or other pairs, of the primary indicator lights. Instead of moving the vehicle about from place to place in order to obtain and choose a level site, the low corner of side of the vehicle, as indicated by the one or pair of primary indicator lights that remain on, may be jacked upwardly until all lights are off, at which time it is known that the vehicle is level within a one degree. The switch 32 may be then turned off and the camp established.

The foregoing detailed description is to be clearly understood as given by way of illustration and example only, the spirit and scope of this invention being limited solely by the appended claims.

I claim:

1. In a liquid level apparatus having a tiltable receptacle, an electrically conductive liquid in the receptacle, a first electrical contact mounted to the receptacle for contact with the electrically conductive liquid throughout a number of positions of said receptacle, and a plurality of secondary electrical contacts mounted to the receptacle and spaced from said primary contact so that the electrically conductive liquid will touch both said primary contact and one or another of said secondary contacts according to the direction of tilt of said receptacle, the improvement comprising
a set of tertiary electrical contacts fixed to said receptacle and spaced from said primary contact by a distance greater than the distance between said primary contact and said secondary contacts, so that said tertiary contacts are not touched by said liquid when said receptacle experiences a first magnitude of tilt sufficient to cause the liquid to contact at least one of said secondary contacts, and whereby at least one contact of said set of tertiary contacts and said primary contact are touched by said electrically conductive liquid when said receptacle experiences tilt of a second magnitude that is greater than said first magnitude.

2. The apparatus of claim 1 including a plurality of primary indicators respectively connected in circuit with said secondary contacts, and further including at least one secondary indicator connected to at least one of said tertiary contacts in a circuit independent of said secondary contacts and independent of said primary indicators.

3. The apparatus of claim 1 including
a source of electrical power and
a plurality of primary indicators, each of said indicators being individually connected in circuit with respectively individual one of said secondary contacts and said source of electrical power,
said primary contact being connected to said source of electrical power, whereby when said liquid touches said primary contact and one of said secondary contacts a circuit is completed to activate a specific one of said indicators to thereby indicate tilt of said receptacle in a predetermined direction,
said set of tertiary contacts being spaced about said primary contact,
said apparatus further including a secondary indicator connected to said source of electrical power, and means for connecting at least one of said tertiary contacts to said secondary indicator, whereby said secondary indicator will be activated when said receptacle experiences said second larger magnitude of tilt and said electrically conductive liquid touches both said primary contact and said one tertiary contact.

4. The apparatus of claim 3 including
a wheeled vehicle having wheels positioned in a rectangular configuration,
means fixedly mounting said receptacle on said vehicle,
said secondary contacts being positioned at the corners of a rectangle centered on said primary contact and having the same orientation as the rectangular configuration of the wheels of said vehicle.

5. The apparatus of claim 4 wherein said indicators are lights, all mounted on a common indicator panel and including means for attaching said indicator panel within the operators compartment of said vehicle.

6. Level measuring apparatus for a recreational vehicle comprising
a receptacle adapted to be fixedly mounted to a vehicle,
said receptacle comprising
a closed chamber having a concave lower surface,
a pool of mercury within said chamber,
a primary contact projecting through said surface at a central portion of the surface into said chamber,
a plurality of secondary contacts equally spaced from said primary contacts by a first distance and projecting through said surface into said chamber,
a plurality of tertiary contacts projecting through said surface into said chamber and equally spaced from said primary contact by a second distance that is greater than said first distance,
an electrical power supply,
a plurality of primary indicators, each individually connected in series circuit with said primary contact, said power supply, and a respectively individual one of said secondary contacts, and
a secondary indicator connected to at least one of said tertiary contacts and series connected with said primary contact and said power supply in a circuit that is independent of said secondary contacts and primary indicators, whereby when said receptacle and the vehicle to which it is mounted experience a first magnitude of tilt in a given direction sufficient to cause said mercury pool to touch both said primary contact and at least one of said secondary contacts, at least one of said primary indicators will be energized to thereupon indicate a relatively low degree of tilt and the direction of said tilt, and whereby when said receptacle and the vehicle to which it is mounted experience a second magnitude of tilt greater than said first magnitude so that said mercury pool touches said primary contact, at least one of said secondary contacts and one of said tertiary contacts, at least one of said primary indicators will be energized to indicate direction of tilt and said secondary indicator will be concomitantly energized to indicate a relatively high degree of tilt.

7. The apparatus of claim 6 wherein said secondary contacts are positioned at the corners of a first rectangle centered on said primary contact and having the same orientation as a rectangle that has its corners at the vehicle wheels, and wherein said tertiary contacts are positioned at the corners of a second rectangle centered on said primary contact and oriented at about 45° relative to said first rectangle.

8. The apparatus of claim 7 wherein said primary indicators are positioned in a configuration having an orientation related to the vehicle wheels so that each indicator may be readily visually correlated with a predetermined corner of the vehicle.

* * * * *